(12) United States Patent
Ito

(10) Patent No.: US 11,000,023 B2
(45) Date of Patent: May 11, 2021

(54) VARIABLE LENGTH GRIP OF FISHING ROD

(71) Applicant: Megabass Inc., Hamamatsu (JP)

(72) Inventor: Koichi Ito, Hamamatsu (JP)

(73) Assignee: MEGABASS INC., Hamamatsu (JP)

( * ) Notice: Subject to any disclaimer, the term of this patent is extended or adjusted under 35 U.S.C. 154(b) by 141 days.

(21) Appl. No.: 16/227,418

(22) Filed: Dec. 20, 2018

(65) Prior Publication Data

US 2019/0223420 A1 Jul. 25, 2019

(30) Foreign Application Priority Data

Jan. 24, 2018 (JP) .............................. JP2018-009633

(51) Int. Cl.
*A01K 87/08* (2006.01)
*A01K 87/02* (2006.01)

(52) U.S. Cl.
CPC .............. *A01K 87/08* (2013.01); *A01K 87/02* (2013.01)

(58) Field of Classification Search
CPC ...... A01K 87/02; A01K 87/025; A01K 87/08; A01K 87/002
USPC ............................... 43/18.1 CT, 23, 18.1 HR
See application file for complete search history.

(56) References Cited

U.S. PATENT DOCUMENTS

| | | | | |
|---|---|---|---|---|
| 1,870,976 A | * | 8/1932 | Welch | A01K 87/02 43/18.1 R |
| 3,447,254 A | * | 6/1969 | Sobel | A01K 87/025 43/18.1 HR |
| 7,607,855 B2 | * | 10/2009 | Lai | A63C 11/221 403/109.5 |
| 8,769,861 B2 | * | 7/2014 | Lee | A01K 87/025 43/18.1 CT |
| 9,480,245 B1 | * | 11/2016 | Palinkas | A01K 87/08 |
| 2003/0145509 A1 | | 8/2003 | Ito | |
| 2004/0231223 A1 | * | 11/2004 | Vogts | A01K 87/08 43/23 |
| 2012/0159834 A1 | | 6/2012 | Lee | |
| 2017/0112113 A1 | * | 4/2017 | Huang | A01K 87/02 |

FOREIGN PATENT DOCUMENTS

| | | | | |
|---|---|---|---|---|
| CN | 2241977 Y | | 12/1996 | |
| EP | 0417011 A1 | * | 3/1991 | .......... A01K 87/025 |
| GB | 2236038 A | * | 3/1991 | ............ A01K 87/00 |
| JP | 2007-135607 A | | 6/2007 | |

OTHER PUBLICATIONS

Chinese Office Action and Search Report dated Dec. 9, 2020 for corresponding Application No. 201910003749.4.

\* cited by examiner

*Primary Examiner* — David J Parsley
*Assistant Examiner* — Danielle A Clerkley
(74) *Attorney, Agent, or Firm* — Birch, Stewart, Kolasch & Birch, LLP

(57) ABSTRACT

In a fishing rod constituted by a rod and a grip which supports a base end side thereof, the grip having a front grip and a rear grip, there are provided a grip frame extending from a rear end part of the rear grip and a guide pipe into which the grip frame is movably inserted. A length of the grip varies in correspondence with a movement of the grip frame.

3 Claims, 8 Drawing Sheets

F I G. 5
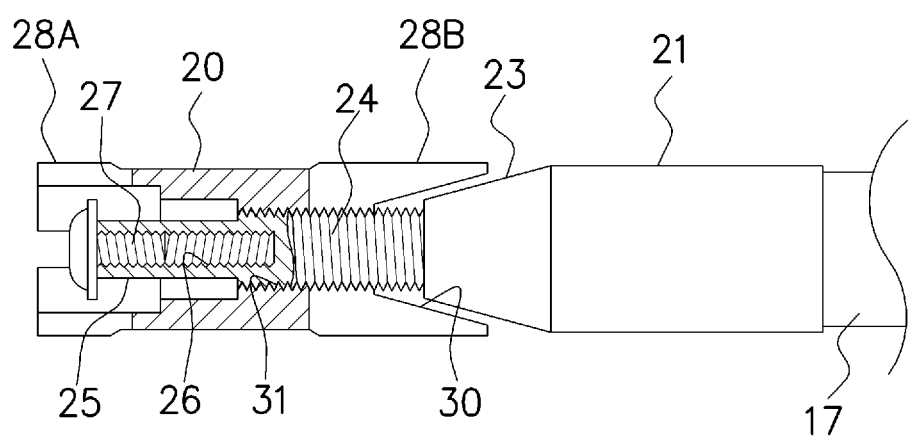

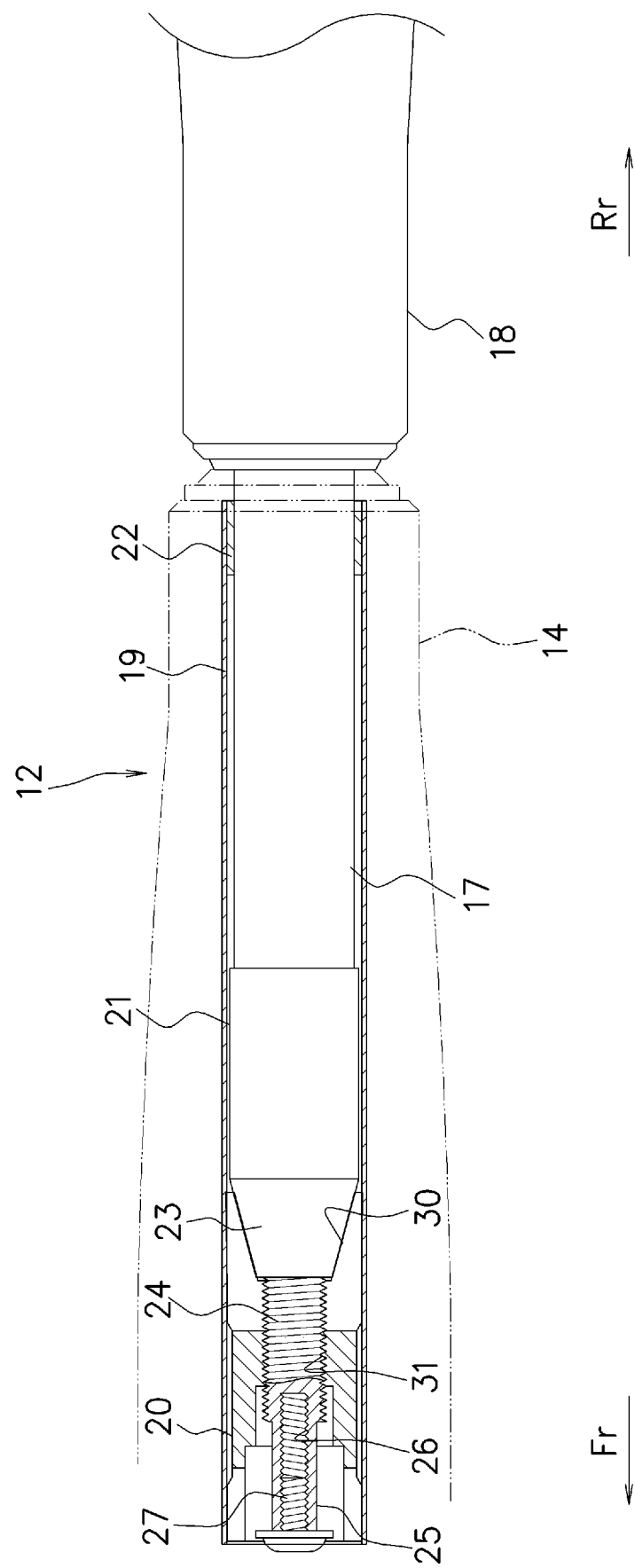

VARIABLE LENGTH GRIP OF FISHING ROD

CROSS-REFERENCE TO RELATED APPLICATIONS

This application is based upon and claims the benefit of priority of the prior Japanese Patent Application No. 2018-009633, filed on Jan. 24, 2018, the entire contents of which are incorporated herein by reference.

BACKGROUND OF THE INVENTION

Field of the Invention

The present invention relates to a variable length grip in a fishing rod used for lure fishing and so on.

Description of the Related Art

As disclosed in Patent Document 1, for example, there is known a fishing rod having a pipe-shaped frame, a reel seat provided in an outer peripheral surface of the frame, a cylindrical front grip screwed to a front end of the reel seat, and a rod inserted in a front end of the pipe-shaped frame, wherein a reel on the reel seat is fixed by screwing the front grip to the reel seat side to make a hood in a rear end of the front grip engage the reel.

[Patent Document 1] Japanese Laid-open Patent Publication No. 2007-135607

Though it is sometimes desired to adjust a length of the grip in correspondence with a use state of the fishing rod, in a conventional fishing rod the length of the grip was fixed at a certain length, and in fact such a request could not be responded to.

SUMMARY OF THE INVENTION

In view of the above circumstances, an object of the present invention is to provide a variable length grip of a fishing rod which enables adjustment of a length of a grip.

In a fishing rod constituted by a rod and a grip which supports a base end side thereof, the grip having a front grip and a rear grip, a variable length grip of a fishing rod according to the present invention has: a grip frame extending from a rear end part of the rear grip; and a guide pipe into which the grip frame is movably inserted, wherein it is configured that a length varies in correspondence with a movement of the grip frame.

Further, in the variable length grip of the fishing rod according the present invention, a stopper inserted movably inside the guide pipe is attached to a tip part of the grip frame, and the grip frame is fixed inside the guide pipe by the stopper.

Further, in the variable length grip of the fishing rod according to the present invention, the stopper has a crimping portion whose diameter can be enlargedly deformed, and the grip frame is fixed inside the guide pipe by crimping of the crimping portion to an inner surface of the guide pipe.

Further, the variable length grip of the fishing rod according to the present invention has stepped portions in a front end part of the grip frame and a rear end part of the guide pipe respectively, the stepped portions constituting a coming-off preventing mechanism which prevents the grip frame from coming off of the guide pipe.

BRIEF DESCRIPTION OF THE DRAWINGS

FIG. 5 is a view illustrating a unitization state at a time of assembling of the variable length grip according to the present invention;

FIG. 7B is a view illustrating a state where the variable length grip according to the present invention is shortest.

DETAILED DESCRIPTION OF THE PREFERRED EMBODIMENTS

Hereinafter, preferred embodiments of a variable length grip of a fishing rod according to the present invention will be described based on the drawings.

Figure 1:
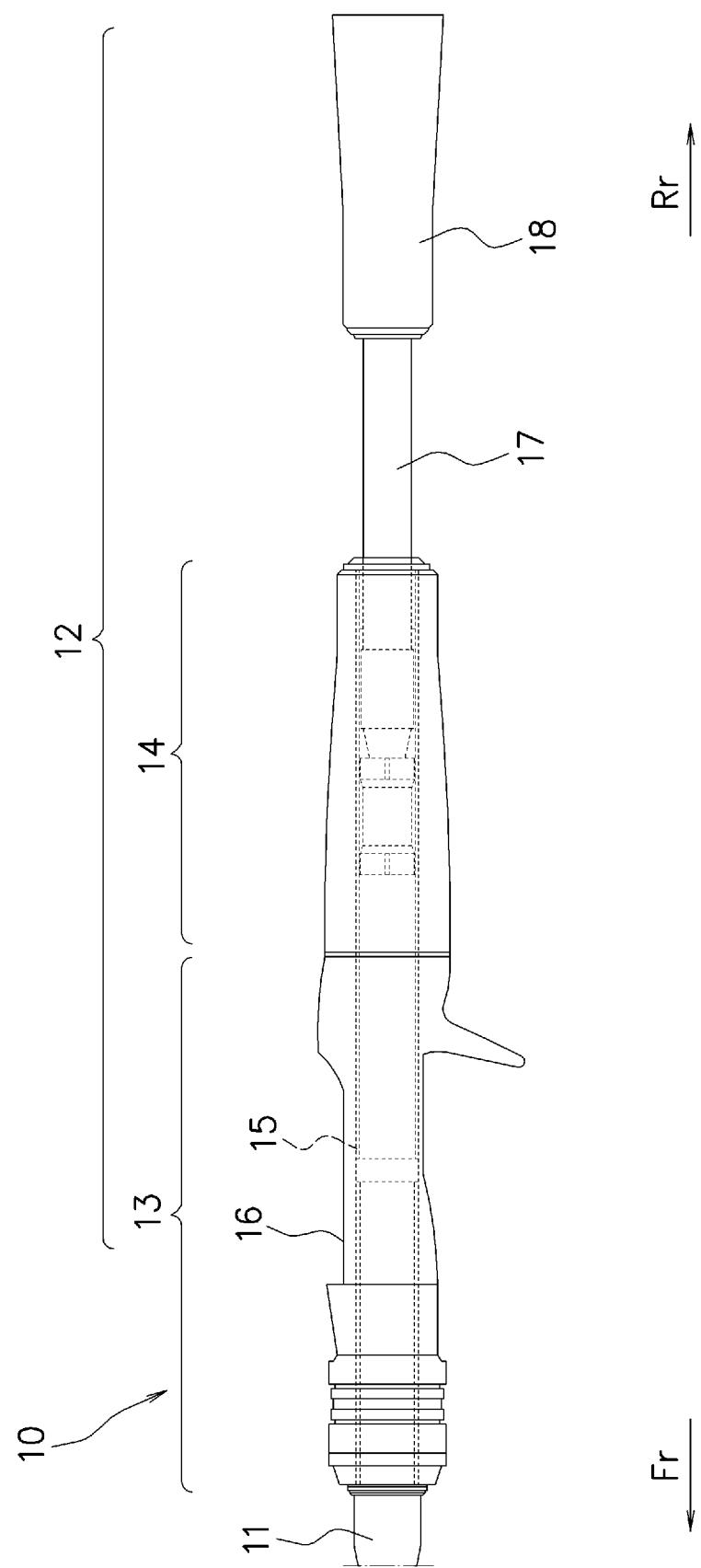
FIG. 1 is a view illustrating a surrounding of a grip of a fishing rod according to the present invention.

FIG. 1 illustrates a surrounding of the grip of the fishing rod according to the present invention. Note that a front is indicated by an arrow Fr and a rear is indicated by an arrow Rr respectively in a substantial part of each drawing which is referred to below. A fishing rod 10 is constituted by a rod 11 and a grip 12 supporting a base end side of the rod 11. The rod 11 is formed of a carbon material or the like, for example, and the grip 12 is generally formed of an EVA resin or a cork material, for example. Note that a plurality of line guides are installed at an appropriate interval along the rod 11 so that a line (not shown) let out from a reel mounted on a later-described reel seat is guided by the line guide. It is configured that a lure connected with that line is released from the line guide on a tip.

The grip 12 has a front grip 13 and a rear grip 14, and is provided in a manner to be supported by an outer peripheral surface of a pipe-shaped frame 15. The reel is to be mounted on a reel seat 16 of the front grip 13. The base end part of the rod 11 penetrates the front grip 13 and fits to the frame 15. In a rear end part of the rear grip 14, there is provided a grip end 18 joined with and supported by the grip frame 17, and these constitute the entire rear grip. Thus, the grip frame 17 and the grip end 18 are included in a length of the entire grip 12.

Figure 2:
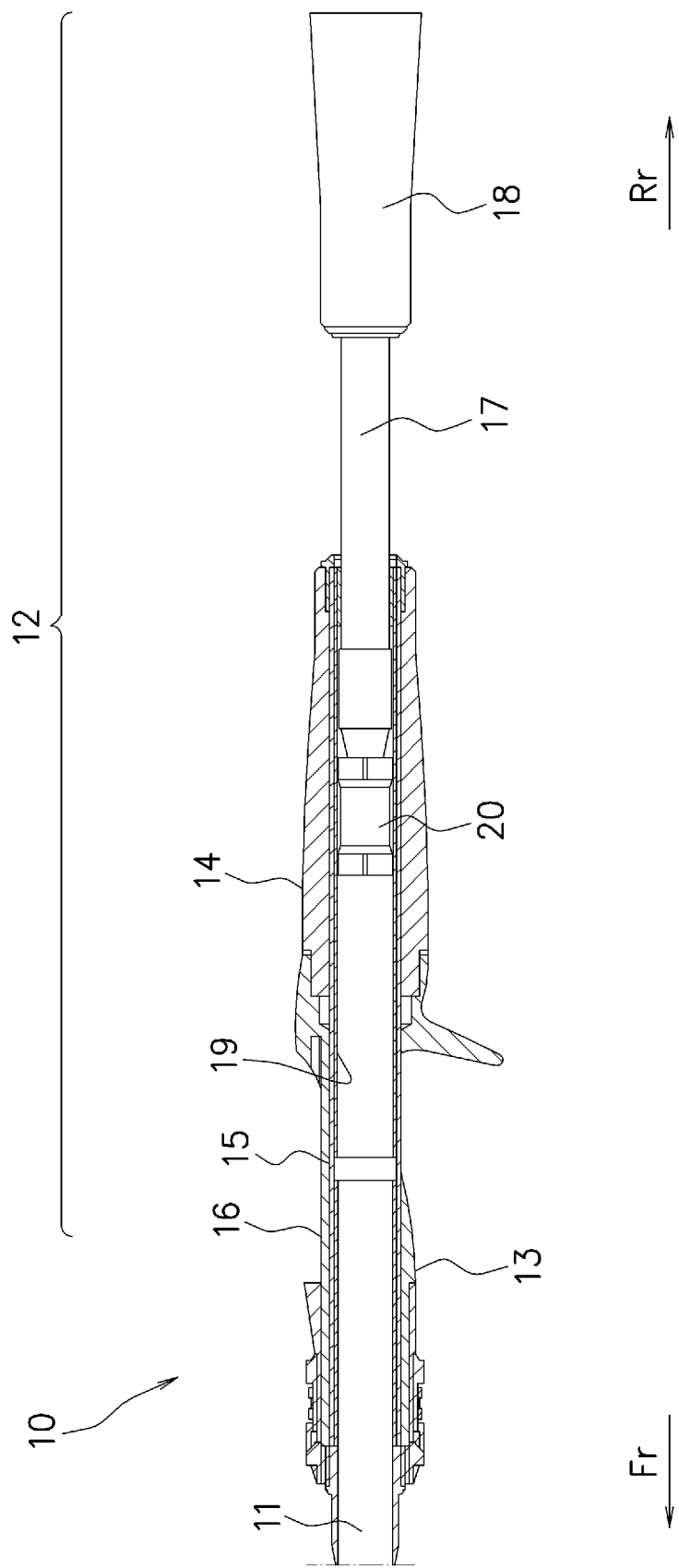
FIG. 2 is a view illustrating an inside structure of the grip of the fishing rod according to the present invention.

FIG. 2 illustrates an inside structure of the grip 12. A guide pipe 19 is fit inside the frame 15 to extend to a part of the front grip 13 and they are fixed to the rear grip 14. The grip frame 17 is inserted into the guide pipe 19 and is movable in a longitudinal direction of the grip 12. To a tip part of the grip frame 17, there is attached a stopper 20 inserted movably inside the guide pipe 19, and in the grip 12 it is configured that the stopper 20 can set and fix a position of the grip frame 17 along the longitudinal direction inside the guide pipe 19.

Figure 3:
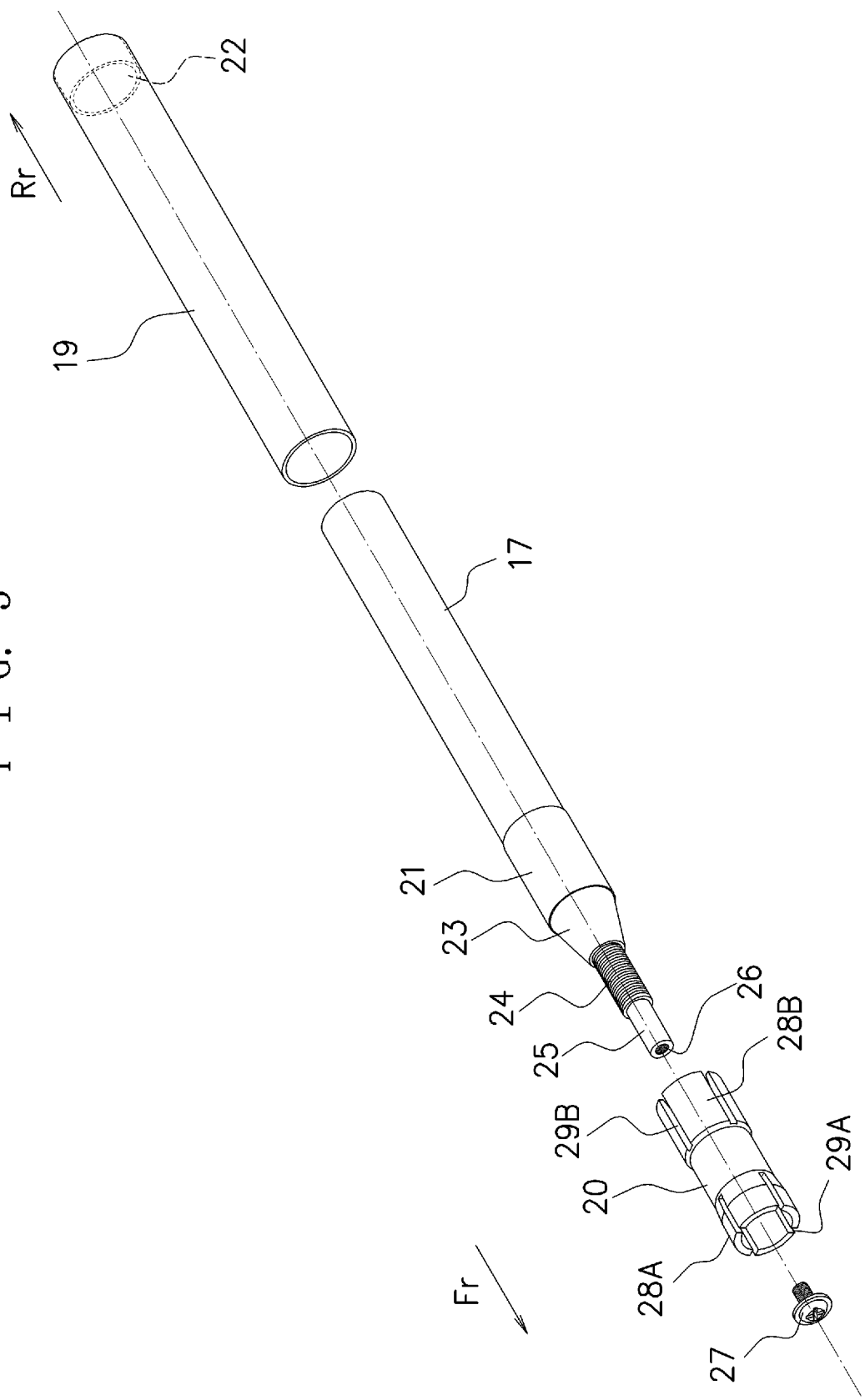
FIG. 3 is an exploded perspective view illustrating a configuration of a substantial part of a variable length grip according to the present invention.
Figure 4:
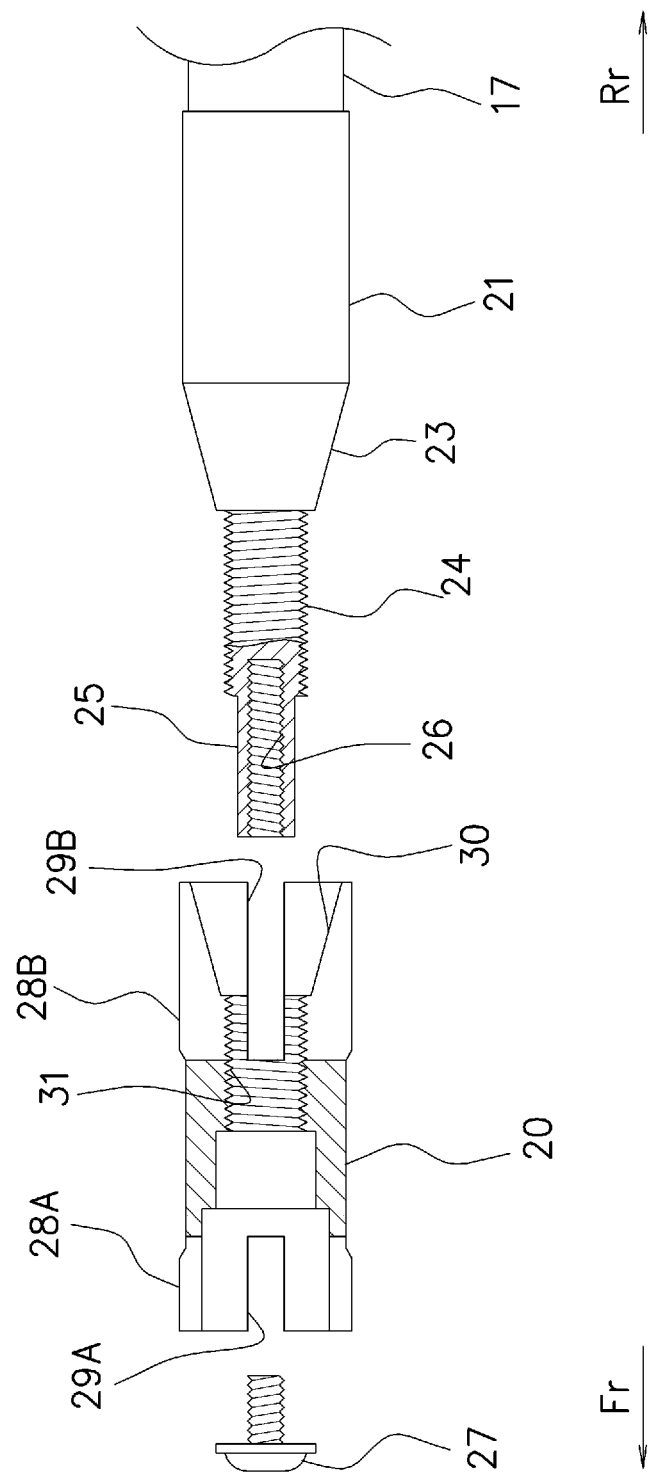
FIG. 4 is a development side cross-sectional view illustrating the configuration of the substantial part of the variable length grip according to the present invention.

FIG. 3 is an exploded perspective view illustrating a configuration of a substantial part of the variable length grip and FIG. 4 is a development side cross-sectional view thereof. The grip frame 17 is made of carbon for example, have a smaller diameter than an inside diameter of the guide pipe 19, and the grip frame 17 itself is freely movable inside the guide pipe 19. In a neighborhood of a front end part of the grip frame 17, there is provided a stepped portion 21 having almost the same diameter as the inside diameter of the guide pipe 19, and the stepped portion 21 can be slid against an inner surface of the guide pipe 19 without a rattling as the grip frame 17 moves. On the other hand, the guide pipe 19 is made of carbon for example, and a stepped portion 22 having an inside diameter almost the same diameter as an outside diameter of the grip frame 17 is installed in a rear end part thereof, and the grip frame 17 is slid against an inner surface of the stepped portion 22 without a rattling.

It is configured that the stepped portion 21 and the stepped portion 22 abut on each other when the grip frame 17 moves as far as to the rear end of the guide pipe 19. The stepped portion 21 and the stepped portion 22 constitute a coming-off preventing mechanism which prevents the grip frame 17 from coming off of the guide pipe 19.

To a front end of the stepped portion 21, there is joined a pressing portion 23 to which an appropriate taper that tapers forwardly, and to a further front end of the pressing portion 23, there is joined a guide shaft 25 having a screw portion 24 (male screw). The pressing portion 23 is made of an ABS resin for example, and the guide shaft 25 is made of stainless steel for example. Joining of each of these portions in the grip frame 17 may be carried out by using an adhesive or joining may be carried out mechanically, and these joining methods can be used in combination. A screw portion 26 (female screw) is formed in a front part of the guide shaft 25, and a screw 27 is to be screwed to this screw portion 26.

The stopper 20 is made of an ABS resin for example and formed to have an almost cylindrical shape. Crimping portions 28A and 28B are formed in the front and rear of the cylindrical shape of the stopper 20. These crimping portions 28A and 28B have outside diameters appropriately larger than the inside diameter of the guide pipe 19 and are configured to pressure-contact against the inner surface of the guide pipe 19 at an appropriate strength. The insides of the crimping portions 28A and 28B are practically formed to be hollow and a plurality of slits 29A and 29B are formed in a front and rear direction at positions diving plurally (for example, dividing into four parts) in a circumferential direction of each of the crimping portions 28A and 28B. Having the slits 29A and 29B enables the crimping portions 28A and 28B to be each deformed to be smaller or larger in a diameter direction.

In an inner surface of the hollow of the crimping portion 28B, there is formed a pressure receiving portion 30 to which an appropriate taper that tapers forwardly is added. The pressure receiving portion 30 has a front-rear direction length almost the same as (may be smaller than) that of the pressing portion 23, and the taper of the pressure receiving portion 30 is set to have a strength almost the same as that of the taper of the pressing portion 23. A screw portion 31 (female screw) to be screwed to the screw portion 24 of the guide shaft 25 is formed in a neighborhood of a center part inside the stopper 20.

In the above configuration, in assembling the grip 12, the grip frame 17 and the stopper 20 are assembled in a unitized state as illustrated in FIG. 5. In other words, the screw portion 24 of the guide shaft 25 is screwed into the screw portion 31 of the stopper 20 as far as to an appropriate depth, whereby the stopper 20 is joined to the grip frame 17. Further, the screw 27 is screwed to the screw portion 26 of the guide shaft 25, to thereby enable the stopper 20 not to come off of the grip frame 17.

The grip frame 17 is inserted into the guide pipe 19 from its rear end part and the grip end 18 is joined and supported by the rear end part of the grip frame 17 extending from the rear end part of the guide pipe 19. In this case, the stopper 20 is inserted into the guide pipe 19. The guide pipe 19 to which the grip frame 17 and the stopper 20 are integrally attached as described above is fit into the frame 15 from its front end part and fixed to the frame 15. Thereby, as illustrated in FIG. 2, the grip 12 constituted by the front grip 13 and the rear grip 14 is assembled.

The crimping portions 28A and 28B of the stopper 20, pressure-contacting against the inner surface of the guide pipe 19 at an appropriate strength, can be moved forward and backward inside the guide pipe 19 by the grip end 18 or the like being griped and the crimping portions 28A and 28B being pushed or pulled in relation to the grip 12 main body. Accordingly, a length of the grip frame 17 extending from the rear end part of guide pipe 19 varies to be longer or shorter, that is, a length of the rear grip 14, i.e., a length of the entire grip 12 including the front grip 13 varies. Note that in that state the stopper 20 is movable inside the guide pipe 19.

Figure 6A:
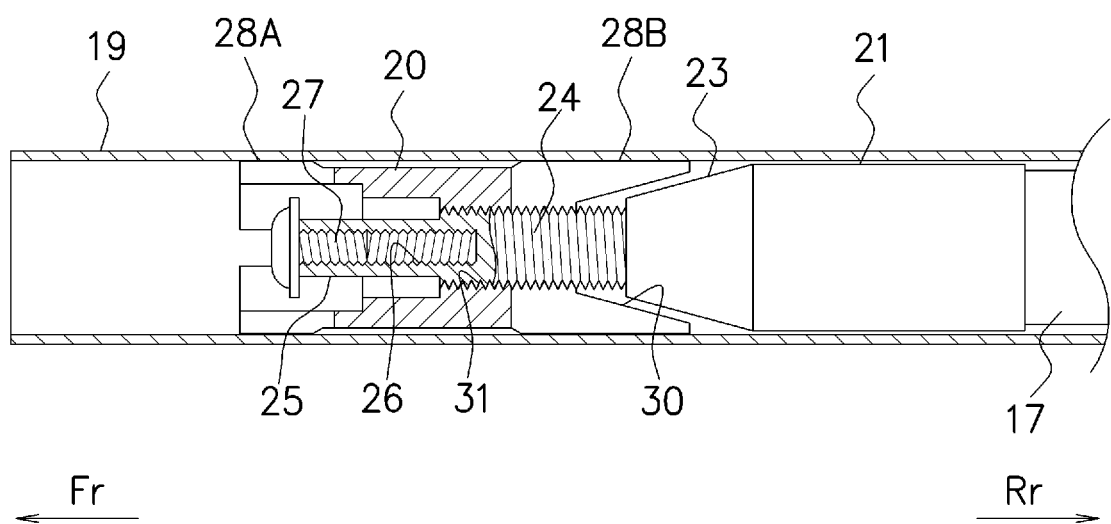
FIG. 6A is a view illustrating a state where a stopper is movable inside a guide pipe in the variable length grip according to the present invention.

FIG. 6A illustrates a state where the stopper 20 is movable inside the guide pipe 19. The screw portion 24 of the guide shaft 25 is screwed into the screw portion 31 of the stopper 20 as far as to the appropriate depth, and in this state a pressure-contacting strength of the crimping portions 28A and 28B against the inner surface of the guide pipe 19 does not reach a degree sufficient to fix the stopper 20 inside the guide pipe 19. Meanwhile, since the crimping portions 28A and 28B pressure-contact against the inner surface of the guide pipe 19, a movement in a rotation direction of the stopper 20 is restricted.

Figure 6B:
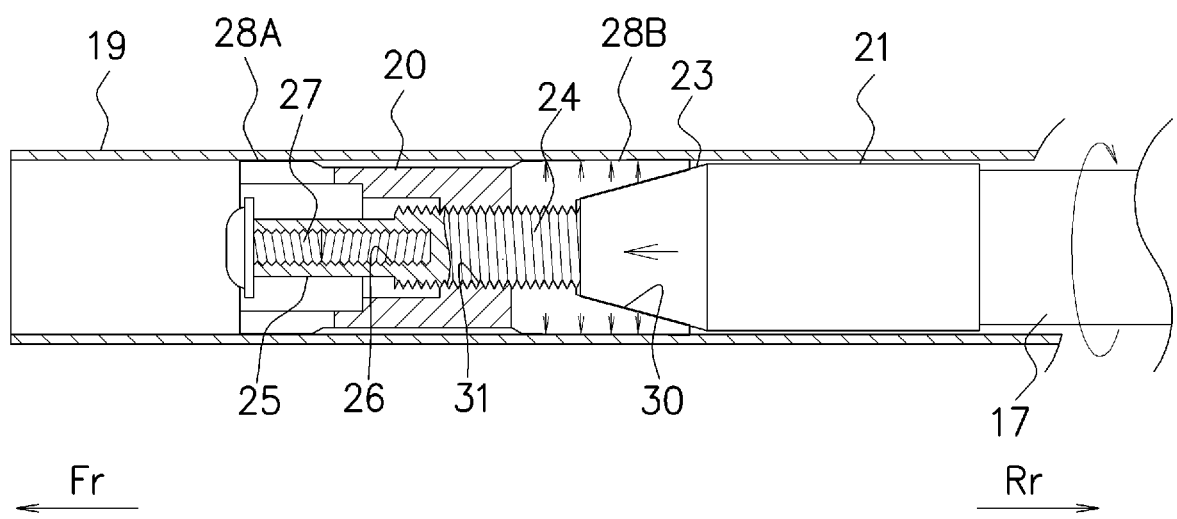
FIG. 6B is a view illustrating a situation at a time that the stopper is fixed inside the guide pipe in the variable length grip according to the present invention.

FIG. 6B illustrates a situation at a time that the stopper 20 is fixed inside the guide pipe 19. By gripping and rotating the grip end 18 (or the grip frame 17 or both thereof), the screw portion 24 of the guide shaft 25 is screwed to the screw portion 31 of the stopper 20. In this case, since the rotation of the stopper 20 is restricted, the screw portion 24 can be screwed appropriately. As a result of screwing of the screw portion 24, the pressing portion 23 on the guide shaft 25 side and the pressure receiving portion 30 of the stopper 20 come into contact with each other, and when the screw portion 24 is further screwed, a diameter of the crimping portion 28B is enlarged. In this case, since the slit 29B is formed in the crimping portion 28B, the diameter of the crimping portion 28B can be enlargedly deformed. Then, the pressure-contacting strength of the crimping portion 28B against the inner surface of the guide pipe 19 increases and the stopper 20 is fixed, in other words, the movement in the front and rear direction inside the guide pipe 19 is restricted.

Figure 7A:
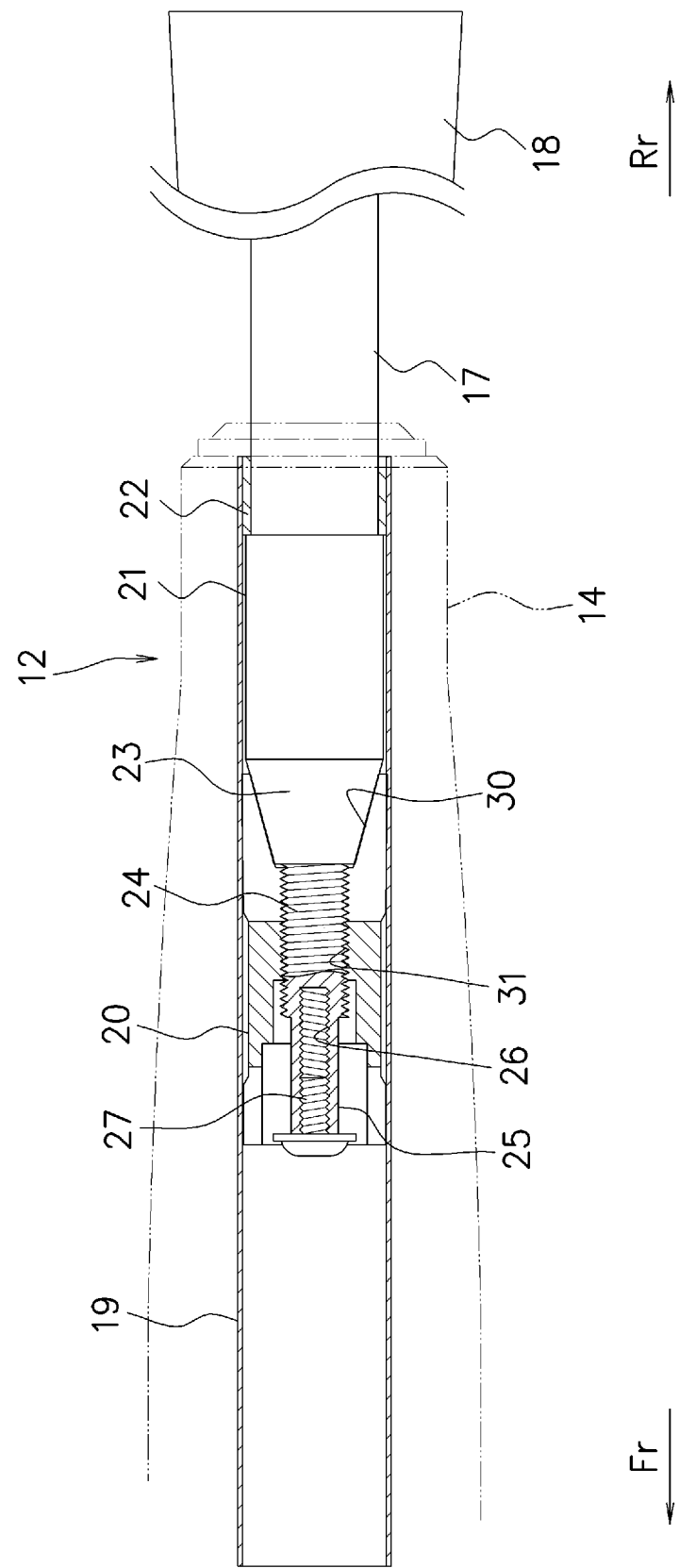
FIG. 7A is a view illustrating a state where the variable length grip according to the present invention is longest.

By moving the stopper 20 to a proper position inside the guide pipe 19 and fixing the stopper 20 there as described above, the entire grip 12 including the front grip 13 can be adjusted to have a desired length as described above. FIG. 7A illustrates a state where the grip 12 is longest, and in this case, the stepped portion 21 and the stepped portion 22 abut on each other. Because of the coming-off preventing mechanism by the stepped portion 21 and the stepped portion 22, the grip frame 17 does not come off of the guide pipe 19. Further, FIG. 7B illustrates a state where the grip 12 is shortest, and in this case, the grip end 18 abuts on the rear end portion of the guide pipe 19.

When it is desired to adjust the length of the grip 12 in correspondence with a use state of the fishing pole 10, the length of the grip 12 can be set freely between the longest state (FIG. 7A) and the shortest state (FIG. 7B). As described above, since the grip 12 of the fishing pole according to the present invention is variable in length, the grip 12 is excellent in usability and ease of use, so that a good result of fishing can be expected.

Though the preferable embodiment of the present invention was described, the present invention is not limited only to the aforementioned embodiment and can be properly changed or the like as necessary.

The strength of the tapers of the pressing portion 23 and the pressure receiving portion 30 can be properly set or changed as necessary, and regarding the shape of the pressing portion 23, a shape of a bent projection, for example, other than the taper, enables enlargement deformation of the diameter of the crimping portion 28B.

Further, the lengths of the grip frame 17, the grip end 18 and so on may be properly set or changed as necessary.

According to the present invention, the length of the grip can be freely set between the longest state and the shortest state.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. A variable length grip of a fishing rod constituted by a rod and a grip which supports a base end side thereof, the grip having a front grip and a rear grip, the variable length grip of the fishing rod comprising:

a grip frame extending from a rear end part of the rear grip;
    a guide pipe into which the grip frame is movably inserted; and
    stepped portions in a front end part of the grip frame and a rear end part of the guide pipe respectively, the stepped portions constituting a coming-off preventing mechanism which prevents the grip frame from coming off of the guide pipe,
    wherein a length of the variable length grip varies in correspondence with a movement of the grip frame,
    the grip frame is provided with a crimping portion,
    the crimping portion has a cylindrical hollow and is configured to pressure-contact against an inner surface of the guide pipe,
    the grip frame is provided with a pressing portion configured to come into contact with a pressure receiving portion formed on an inner surface of the hollow of the crimping portion, and
    when the pressing portion and the pressure receiving portion come into contact with each other, the crimping portion enlarges and crimps to an inner surface of the guide pipe.

2. The variable length grip of the fishing rod according to claim 1,
    wherein the guide pipe is fixed to the rear grip.

3. The variable length grip of the fishing rod according to claim 1,
    wherein the pressing portion and the pressure receiving portion come close to each other by being screwed by a screw portion.

* * * * *